March 21, 1933. R. C. NEWHOUSE 1,902,517
ROTARY COOLER
Filed July 11, 1929
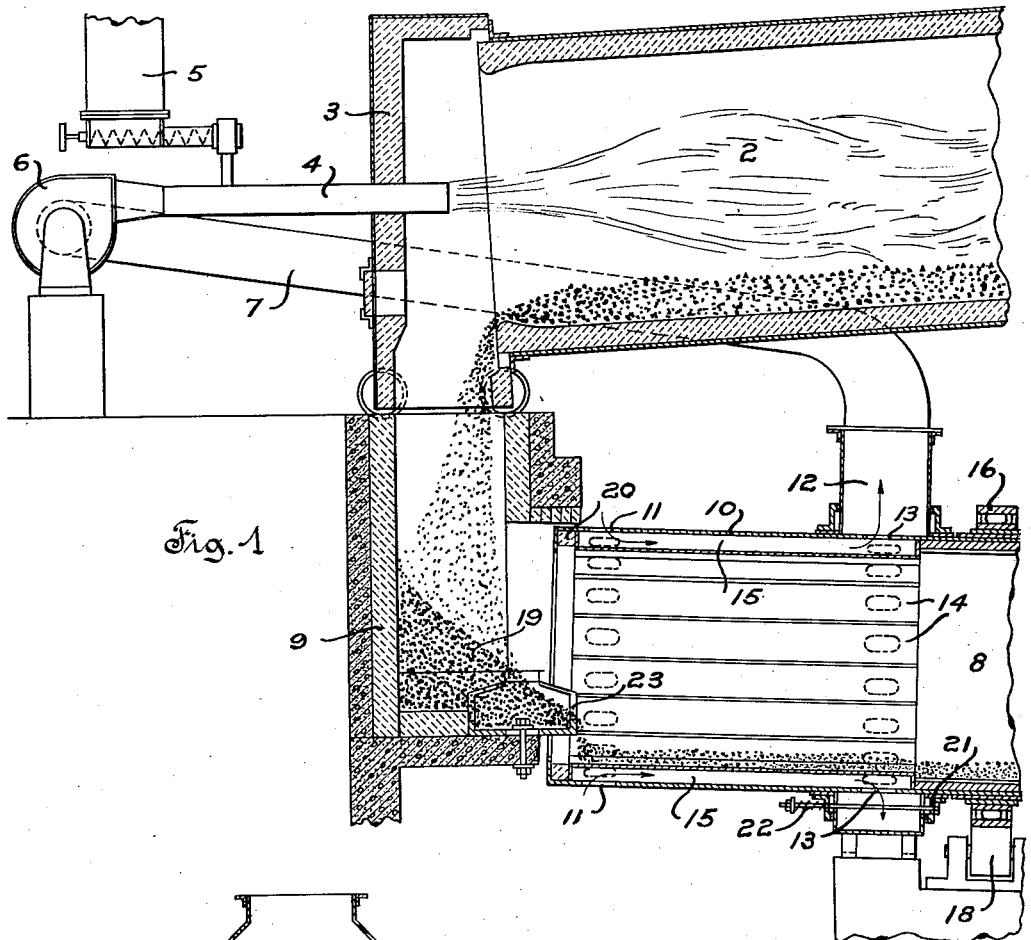
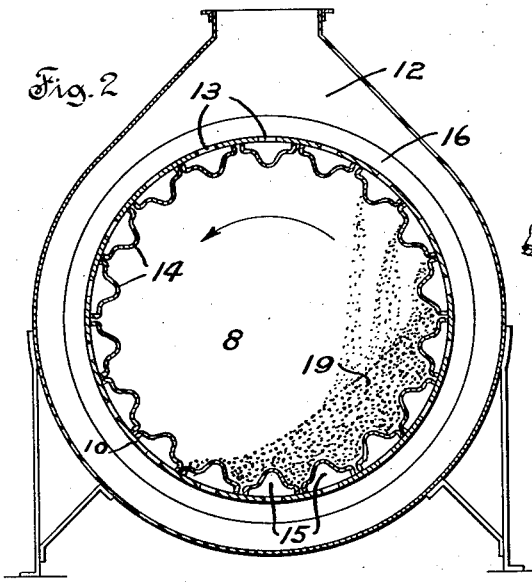
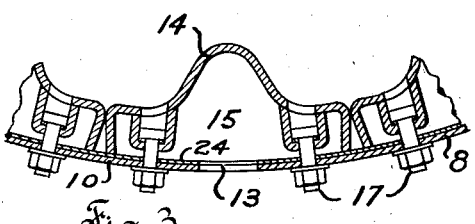
Inventor
R. C. Newhouse
by
Attorney Patented Mar. 21, 1933

1,902,517

UNITED STATES PATENT OFFICE

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

ROTARY COOLER

Application filed July 11, 1929. Serial No. 377,384.

The present invention relates in general to improvements in the art of transferring heat, and relates more specifically to improvements in the construction and operation of rotary heat transfer devices especially adapted for the cooling of cement clinker or the like.

A general object of the invention is to provide an improved heat transfer device for treating granular material such as cement clinker, which is simple and compact in construction and efficient in operation.

When cement clinker is delivered from the discharge end of a rotary kiln such as is customarily utilized in the cement industry, it is in highly heated condition, and it has heretofore been customary to utilize a rotary cooler in which the clinker was gradually cooled by the passage of air through the cooler in a direction opposite to that of the travel of the material passing through the cooler. This air was naturally preheated due to its contact with the hot clinker in the cooler, and was therefore subsequently utilized to support combustion of the fuel admitted to the kiln during production of the clinker. The problem of handling the hot clinker admitted to the cooler from the kiln naturally presents many obstacles, and because ordinary steel and cast iron is rapidly destroyed if permitted to come in contact with the hot clinker, it was the general practice to line a considerable part of the inlet portion of the cooler with refractory material such as fire brick, or with relatively expensive material such as alloy steel.

One of the main objections to the use of fire brick is that it is not practical to form this material with lifters so as to shower the material through the air passing along the interior of the cooler. With a smooth fire brick lining, the hot clinker lies in the bottom of the cooling chamber and the cooling air comes in contact with only the relatively small surface at the top of the material. This naturally results in ineffective heating of the air and slow cooling of the clinker. Since it is desirable to cool Portland cement clinker as rapidly as possible, not only in order that it may be ground readily, but also because fast cooling of the clinker products better Portland cement, the fire brick lining is relatively ineffective.

It has heretofore been proposed to quickly cool the hot clinker in contact with ordinary iron or steel, by the use of pockets at the inlet end of the cooler, which are adapted to dip into water to thereby protect the metal. These pockets are adapted to shower the clinker through the air passing along the cooler, thereby quickly cooling the clinker and producing desirable heating of the air prior to admission thereof to the kiln. While the use of pockets dipping in water is effective, the water naturally absorbs considerable heat which cannot be subsequently utilized to advantage in the kiln.

Another objection to the prior rotary clinker coolers, is that only the secondary air used for combustion in the kiln, is utilized for the purpose of cooling the clinker. It is not common practice to use hot air as the primary air for injecting the fuel into the kiln. The reason that heated air from the cooler is not ordinarily utilized for the purpose of injecting fuel into the kiln, is that the clinker dust which is picked up by the air passing directly through the cooler, is extremely abrasive and quickly wears the fan or blower plates and the blast pipes. For this reason, in order to introduce a greater quantity of air into the cooler than can be used as secondary air a stack is often placed at the end of the cooler and a part of the air is permitted to escape through the stack. This method of cooling the clinker also results in loss of heat and consequent reduction in efficiency.

It is a more specific object of the present invention to provide means for effectively utilizing for combustion purposes in the kiln, all of the heat which is abstracted from the clinker. It is a further specific object of the present invention to provide means for quickly cooling the clinker delivered from the kiln and for permitting the utilization of relatively cheap metal liners in the cooler, instead of the fire brick liners or the expensive alloy steel liners heretofore utilized. It is still another specific object of the present invention to provide means for utilizing relatively clean preheated air for injecting the fuel into a rotary kiln, while permitting the utilization of preheated secondary air for the purpose of supporting combustion, in the usual manner. These and other objects and advantages of the present improvement will appear from the following description.

A clear conception of an embodiment of the invention and of the mode of constructing and of operating coolers in accordance therewith, may be had by referring to the drawing accompanying and forming a part of this specification in which like reference characters designate the same or similar parts in the various views.

Fig. 1 is a fragmentary longitudinal central vertical section through the discharge end of a kiln and the inlet end of a clinker cooler, embodying the improvement.

Fig. 2 is a somewhat enlarged transverse vertical section through the inlet end of the clinker cooler.

Fig. 3 is a further enlarged fragmentary transverse section through the inlet end of the clinker cooler.

Referring specifically to Fig. 1, the tubular kiln 2 is supported for rotation about a slightly inclined but substantially horizontal axis and is adapted to deliver hot granular material 19 commonly called clinker, by gravity through a firing hood 3 into a receptacle or pit 9 located directly below the firing hood. The rotary kiln 2 is fired by means of a burner or injection nozzle 4 through which fluent fuel such as powdered coal or oil, may be delivered from a feeder 5 by means of an air blast created by a fan or blower 6. The pit 9 into which the material 19 is delivered in highly heated condition from the kiln 2, may be provided with a delivery spout 23 preferably formed of metal and extending beyond the fire brick wall which lines the outlet from the pit.

Disposed directly beneath the rotary kiln 2 is a rotary clinker cooler 8 which is rotatable about a substantially horizontal axis slightly inclined in a direction opposite to that of the axis of the kiln. The inlet end of the rotary cooler 8 is of special construction and the cooler shell 10 is free to expand longitudinally with respect to the pit 9, as shown. Located at the inlet opening of the cooler 8 is a ring 20 of fire brick or the like, this ring being protected from direct contact with the heated clinker, by means of the spout 23. Beyond the ring 20, the inlet end of the cooler shell 10 is lined with a series of elongated hollow liners 14 formed of relatively thin metal such as sheet steel, these liners being formed to provide an annular series of corrugations within the cooler 8, and also providing a series of longitudinal air passages 15 between the liners 14 and the shell 10. Each of the passages 15 is provided with an air inlet opening 11 directly adjacent to the fire brick ring 20, and with a heated air discharge opening 13 at its opposite end. The air discharge openings 13 communicate with a common collecting chamber 12 which communicates through a pipe 7 with the suction opening of the blower 6. The casing which forms the chamber 12 surrounds the shell 10, and sealing plates 21 through which the shell 10 is longitudinally slidable during expansion and contraction, are pressed against the opposite sides of this casing by means of springs 22 coacting with rods as shown in Fig. 1. The portion of the cooler 8 beyond the liners 14 may be lined with any suitable material which need not necessarily be adapted to withstand high temperatures, and the cooler 8 is provided with external tires 16 cooperating with supporting rollers 18. The liners 14 may be fastened to the shell 10 by means of bolts 17, and asbestos or other heat insulating sheeting 24 may be inserted between the liners 14 and the shell 10 in order to prevent undesirable radiation of heat.

During normal operation of the rotary kiln, the finished clinker is delivered by gravity from the lower end of the kiln through the firing hood 3 into the pit 9, and after building up a sufficient incline in the bottom of the pit 9, the clinker subsequently delivered to the pit flows by gravity over the spout 23 into the receiving end of the cooler 8 as illustrated in Fig. 1. During rotation of the cooler 8, the material is carried upwardly along the rising side of the cooler shell 10 by means of the corrugations provided by the liners 14 in the manner disclosed in Fig. 2, and a portion of the material is constantly showered across the free space within the cooler 8. When the blower 6 is in operation, air is drawn from the chamber 12 through the suction pipe 7, and this air is delivered as primary air into the kiln 2 together with fuel discharged into the burner 4 from the fuel feeder 5. The suction created in the chamber 12 causes air to flow through the openings 11, passages 15 and discharge openings 13. This primary air flows in direct contact with the liners 14 which quickly become highly heated by contact with the hot cement clinker. The air passing through the passages 15 and through the pipe 7 therefore becomes highly heated and is utilized in this condition for the primary injection of fuel. This air, it will be noted, is free from dust as it does not come in direct contact with the clinker. Other air is drawn upwardly through the interior of the cooler 8 and comes in direct contact with the hot clinker which passes downwardly through the cooler and some of which is showered through the free space within the cooler. This other air also absorbs heat directly from the clinker and is utilized as secondary air for supporting combustion within the kiln 2. It will therefore be apparent that both the primary and the secondary air is highly heated before admission thereof to the kiln, and practically all of the heat which is quickly given up by the clinker admitted to the cooler 8, is subsequently utilized in the kiln.

By inserting a heat insulating lining such as sheets 24 between the liners 14 and the shell 10, the radiation loss is reduced to a minimum. The material utilized in the construction of the liners 14 may be relatively low grade or quality, as the air flowing through the passages 15 maintains these liners in relatively cool condition and prevents burning thereof. The cooling action upon the liners is also augmented by the air flowing directly through the cooler. The cooler is not restrained against free longitudinal expansion or contraction, and the sealing plates 21 effectively prevent undesirable escape of heated air. The spout 23 functions to prevent rapid deterioration of the fire brick ring 20, and the liners 14 should be formed of sufficient length to insure cooling of the clinker to such an extent before it reaches the lining in the lower portion of the cooler 8, so that no destructive action upon the linings therein results.

It will be apparent that the present improvement will effectively accomplish the objects of the present invention and will permit rapid cooling of the clinker with minimum loss of heat. The apparatus is extremely simple and compact in construction and is adapted to facilitate production of Portland cement of highest quality. The invention is obviously capable of application to heat transfer devices other than coolers, and should not be thus restricted by the specific disclosure of a cooler.

It should be understood that it is not desired to limit the invention to the exact details of construction of the apparatus herein shown and described, for various modifications within the scope of the claims may occur to persons skilled in the art.

It is claimed and desired to secure by Letters Patent:

1. In combination. a rotary shell, inlet means for delivering hot granular material into an end of said shell, a corrugated lining for said shell located adjacent to said end and forming a series of passages extending longitudinally of the shell axis, said passages being isolated from the material confining space within said shell, the corrugations of said lining being adapted to shower material within said shell, and means for producing a flow of cooling air through said passages.

2. In combination with a kiln, a rotary shell, means for delivering hot granular material from the kiln to said shell, means within said shell forming a series of passages adjoining said shell and segregated from the material confining space therein, and means for producing a flow of cooling air through said passages and for delivering said air to the kiln, the interior of said shell being in open communication with the interior of the kiln through said material delivery means whereby air is also permitted to pass along the granular material therein and into said kiln.

3. In combination with a kiln, a rotary shell, means for delivering hot granular material from the kiln into said shell, means within said shell forming a plurality of passages extending along said shell and segregated from the material confining space therein, means for producing a flow of cooling air through said passages in the direction of travel of the material through said shell, and means for delivering the air leaving said passages into the kiln together with fuel, the material confining space within said shell being in open communication with the interior of said kiln.

4. In combination, a cooler comprising a rotary shell having a fire brick ring associated with an end thereof, inlet means for delivering hot granular material into said shell beyond said ring, and a relatively thin metal lining adjoining said ring and extending longitudinally of and contacting with said shell, a portion of said lining being spaced from the interior surface of said shell to form a passage extending longitudinally of the shell axis, said passage being isolated from the material confining space within said shell.

5. In combination, a cooler comprising a rotary shell, inlet means for delivering hot material into an end of said shell, a metal lining for the interior of said shell forming a series of passages extending longitudinally of the shell axis, said passages being isolated from the material confining space within said shell, means for producing a flow of cooling air through said passages, a casing for collecting the air delivered from all of said passages, and a sealing device disposed between said casing and said shell.

6. In combination, a cooler comprising a rotary shell, inlet means for delivering hot granular material into said shell, means within said shell forming a series of passages extending longitudinally of the axis of said shell, said passages being isolated from the material confining space within said shell, a casing surrounding said shell and communicating with all of said passages, means for sealing the joints between said casing and said shell, and means for producing a flow of cooling air through said passages and said casing.

7. A cooler for rapidly cooling clinker from a cement kiln, comprising a rotary shell provided with a clinker receiving opening adjacent an end thereof, a corrugated metal lining covering the interior surface of said shell adjacent said end, said lining serving to lift and shower the clinker as the shell is rotated and forming a series of passages isolated from the clinker confining space within said shell, and means for effecting a flow of air through said passages in the direction of movement of the clinker through the shell.

8. In combination, a kiln, a cooler for rapidly cooling hot cement clinker received from said kiln, said cooler comprising a rotary shell and being provided with a clinker receiving opening adjacent an end thereof, a combined lifter and passage forming means covering the interior surface of said shell adjacent said end, said passages extending longitudinally of the axis of said shell and being isolated from the clinker confining space within said shell, means connecting the discharge outlet of said kiln with the clinker receiving opening of said cooler, a fuel nozzle for said kiln, and means for effecting a circulation of air through said passages in the direction of movement of the clinker through said cooler, and into said nozzle.

In testimony whereof, the signature of the inventor is affixed hereto.

RAY C. NEWHOUSE.